US006832504B1

(12) United States Patent
Birkmann

(10) Patent No.: US 6,832,504 B1
(45) Date of Patent: Dec. 21, 2004

(54) LIQUID SENSING SYSTEM FOR AN AIRCRAFT GALLEY COOLER USING A TWO PHASE WORKING FLUID

(75) Inventor: Timothy Birkmann, Corona, CA (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 10/718,001

(22) Filed: Nov. 19, 2003

(51) Int. Cl.⁷ .......................... G01M 3/04; G08B 21/00
(52) U.S. Cl. ........................................... 73/40; 340/605
(58) Field of Search .............................. 73/40; 702/51; 340/605; 62/125, 127, 129; 701/14

(56) References Cited

U.S. PATENT DOCUMENTS

| 2,779,171 A | | 1/1957 | Lindenblad |
| 3,216,215 A | | 11/1965 | Schuett |
| 3,748,898 A | * | 7/1973 | Hellouin de Menibus .... 73/168 |
| 4,173,893 A | * | 11/1979 | Hedrick ..................... 73/304 C |
| 4,890,463 A | | 1/1990 | Cantoni |
| 5,052,472 A | | 10/1991 | Takahashi et al. |
| 5,265,437 A | | 11/1993 | Saperstein et al. |
| 5,369,960 A | | 12/1994 | Mueller et al. |
| 5,491,979 A | | 2/1996 | Kull et al. |
| 5,496,000 A | | 3/1996 | Mueller |
| 5,513,500 A | | 5/1996 | Fischer et al. |
| 6,014,866 A | | 1/2000 | Durham |
| 6,711,961 B2 | * | 3/2004 | Theriault et al. .......... 73/865.6 |

* cited by examiner

Primary Examiner—Michael Cygan
(74) Attorney, Agent, or Firm—Fulwider Patton Lee & Utecht, LLP

(57) ABSTRACT

The liquid sensing system for an aircraft cooler includes a middle liquid level sensor for detecting a middle liquid level of a working fluid, a liquid temperature sensor, a ventilation controller for generating a flight phase signal indicative of a flight phase of the aircraft, and a recirculation unit annunciating a working fluid system leak condition based on the middle liquid level, the liquid temperature, and the flight phase. The recirculation unit only evaluates the working fluid system leak condition during a ground flight phase and a cruise flight phase. A bottom liquid level, pressure in a working fluid accumulator and discharge pressure are also determined, and a no working fluid failure condition is annunciated based on the bottom liquid level signal, the accumulator pressure signal, and the discharge pressure signal.

15 Claims, 13 Drawing Sheets

LIQUID SENSING SYSTEM FOR AN AIRCRAFT GALLEY COOLER USING A TWO PHASE WORKING FLUID

BACKGROUND OF THE INVENTION

1. Field of the Invention

This invention relates to transport aircraft galley systems, and more particularly, to a liquid sensing system that monitors leak and fault conditions of circulation of a two phase working fluid used by an aircraft cooler.

2. Description of Related Art

Aircraft galley systems for modern transport aircraft incorporate food carts which are cooled to prevent food spoilage prior to use by the cabin attendants for distribution of food to the passengers. These food carts have in the past been interfaced with cold air supply systems in the galley designed to cool the interiors of the food carts. Such cool air distribution systems were generally co-located with the balance of the galley and interface to the food carts by means of gaskets connecting the food carts to a plenum containing the cool air.

As space in modern aircraft has become more at a premium and more efficient means of cooling the carts has become necessary, a need for alternatives to such systems emerged. Furthermore, FDA rulings lowered the required temperature at which the interior of the food carts must be kept to prevent food spoilage. Additionally, it has become more desirable to remove refrigeration equipment from the galley compartment and to find other means to properly cool the food carts without locating the entire refrigeration system in the galley area. In order to be compatible with modern transport aircraft requirements, it has become important to have an increased degree of safety and modularity for any aircraft system incorporating electronics or electric pumps. In any event, it is important that any system that interfaces with either food or the cabin area can be configured to provide a wide range of cooling capacity as a function of the food and food carts that are to be interfaced with such a system.

Such cooling systems require control systems to maintain temperatures within the food carts within precise limits to prevent food spoilage or freezing. The present invention satisfies these and numerous other requirements for transport aircraft.

SUMMARY OF THE INVENTION

The present invention overcomes the shortcomings of previously known systems for cooling food carts in aircraft. The system of the invention serves not only to remove the bulk of the refrigeration system from the galley area but also obviates the need to accommodate bulky air ducts that would supply cooled air from refrigeration stations directly to the carts. Additionally, the system allows low temperatures to be readily achieved in a very controllable manner.

In general terms, the invention employs an intermediate working fluid to transfer heat from a cart or carts to a remote chiller or chillers. The components of the system may be advantageously positioned in the aircraft and do not have to be contained in a single location. More specifically, the invention utilizes a plurality of heat exchangers to effect a cooling of the carts wherein heat from the food cart is first transferred to an airflow; heat from the airflow is then transferred to an intermediate working fluid which is circulated between a location immediately adjacent the food carts and a remote chiller; heat from the intermediate working fluid is subsequently transferred to the chiller working fluid; and finally, heat from the chiller working fluid is expelled to ambient air.

While the chiller working fluid may undergo a phase change in order to transfer heat from the intermediate working fluid to the ambient air, the intermediate working fluid typically remains in its liquid phase throughout its circulation. A recirculation pump serves to circulate the intermediate working fluid through a distribution system that may link a plurality of chillers to a plurality of food carts. An expansion tank accommodates the expansion and contraction that the intermediate working fluid undergoes during its circulation. Each of the chillers cycles the associated chiller working fluid between a condenser and evaporator in a conventional manner whereby an expansion valve is relied upon to control the phase change therebetween.

The temperature of the food cart is regulated by a combination of controls. The speed of a fan circulating air flowing over the heat exchanger for the intermediate working fluid and directing the air cooled in this manner through the food cart may be varied so as to influence the rate of heat transfer between the food cart and the intermediate working fluid. A variable flow valve may be used to control the flow of intermediate working fluid to each cart, while the flow velocity of the intermediate working fluid circulating in the entire distribution system may be controlled by varying the speed of the recirculation pump. Finally, each of the chillers may be turned on or off depending upon the temperature of the intermediate working fluid returning from the food carts. Temperature sensors and pressure sensors are positioned throughout the system to monitor these parameters at appropriate locations in order to allow the operation of the overall system to be properly controlled by the use of electronic controls such as programmable industrial controllers (PIDs).

In another aspect of the invention, the invention provides for a liquid sensing system for a cooler for an aircraft using a two phase working fluid, in which the cooler circulates the two phase working fluid between a cooling heat exchanger and a chiller unit for cooling the two phase working fluid. The liquid sensing system includes a middle liquid level sensor for detecting a middle liquid level of the working fluid and generating a middle liquid level signal, a liquid temperature sensor for sensing temperature of the working fluid and generating a liquid temperature signal, means for generating a flight phase signal indicative of a flight phase of the aircraft; and a recirculation unit for receiving the middle liquid level signal, the liquid temperature signal, and the flight phase signal, the recirculation unit annunciating a working fluid system leak condition based on the middle liquid level signal, the liquid temperature signal, and the flight phase signal. In one aspect of the liquid sensing system, the recirculation unit only evaluates the working fluid system leak condition during a ground flight phase and a cruise flight phase. In another aspect, the recirculation unit requires a confirmation time of the middle liquid level sensor to indicate the absence of working fluid continuously for 15 minutes to annunciate a working fluid system leak condition. In a further presently preferred aspect, the recirculation unit additionally annunciates a system leak based upon a temperature indicated by the liquid temperature sensor following the 15 minute confirmation time of the middle liquid level sensor.

The invention according also provides for a method for sensing leaks in a cooler for an aircraft using a two phase working fluid, the aircraft cooler circulating the two phase working fluid between a cooling heat exchanger and a chiller unit for cooling the two phase working fluid. The method includes the steps of detecting a middle liquid level of the working fluid and generating a middle liquid level signal, sensing temperature of the working fluid and generating a liquid temperature signal, generating a flight phase signal indicative of a flight phase of the aircraft, and receiving the middle liquid level signal, the liquid temperature signal, and the flight phase signal, evaluating a working fluid system leak condition, and annunciating the working fluid system leak condition based on the middle liquid level signal, the liquid temperature signal, and the flight phase signal. In a preferred aspect of the method, the working fluid system leak condition is only evaluated during a ground flight phase and a cruise flight phase. In another aspect, the annunciation of the working fluid system leak condition requires a confirmation time of the middle liquid level signal to indicate the absence of the working fluid continuously for 15 minutes. In another presently preferred aspect, the annunciation of the working fluid system leak condition is based upon the liquid temperature signal following the 15 minute confirmation time of the middle liquid level signal. If the temperature indicated by the liquid temperature signal is greater than or equal to 13 degrees F., and less than or equal to 55 degrees F., then a minor system leak condition is annunciated. If the temperature indicated by the liquid temperature signal is greater than 55 degrees F., then a major system leak condition is annunciated. However, if the flight phase changes during the evaluation of a leak condition, the leak conditions are cancelled.

In another presently preferred aspect, the method further includes sensing a bottom liquid level and generating a bottom liquid level signal, sensing pressure in a working fluid accumulator and generating an accumulator pressure signal, and sensing a discharge pressure of the working fluid and generating a discharge pressure signal, and annunciating a no working fluid failure condition based on the bottom liquid level signal, the accumulator pressure signal, and the discharge pressure signal. A differential pressure is determined based upon the discharge pressure signal and the accumulator pressure signal, and a pump airlock condition is determined when the differential pressure drops below a predetermined pressure for a predetermined period of time. A pump airlock failure condition is determined for a predetermined number of pump airlock conditions.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
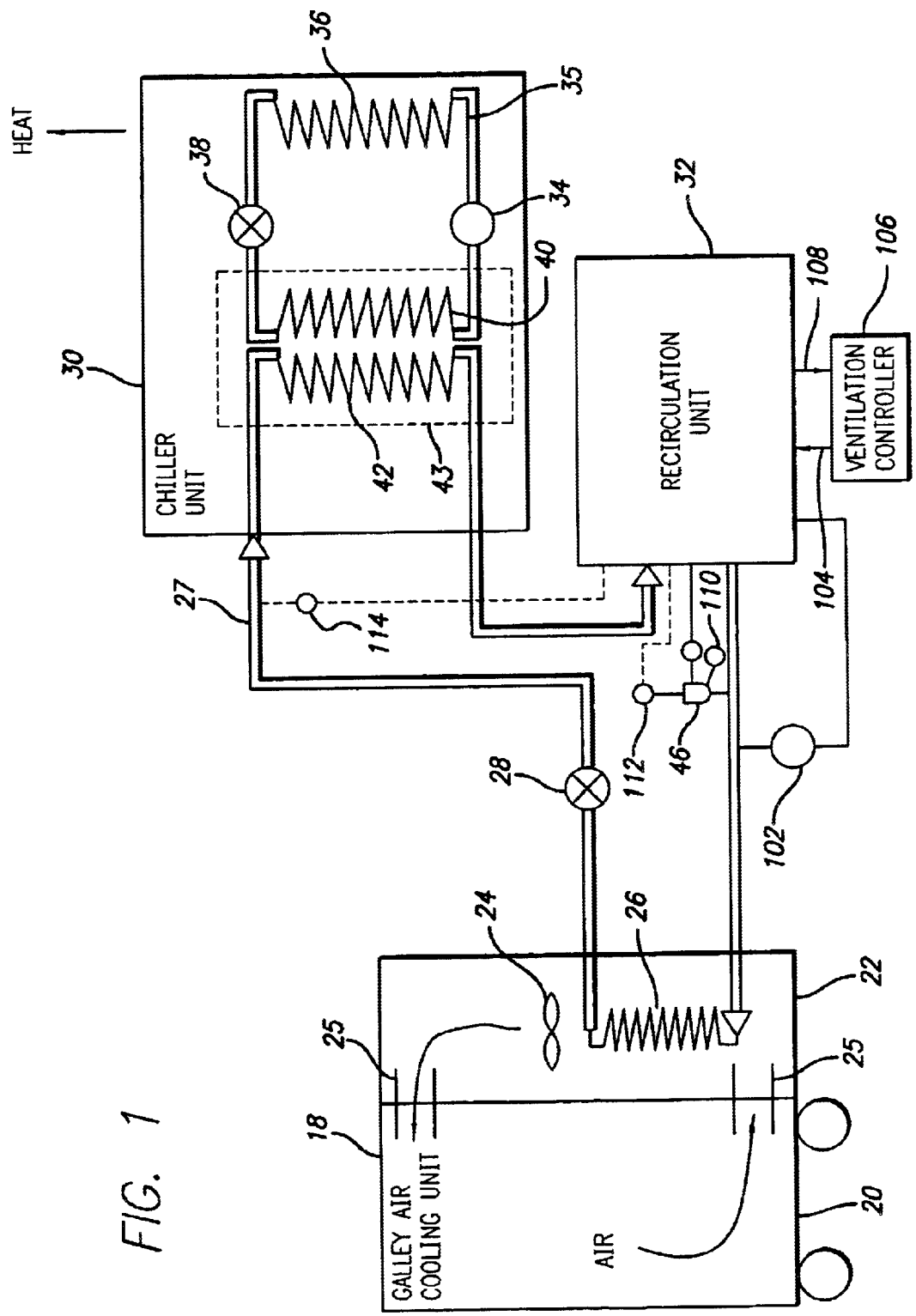
FIG. 1 is a schematic diagram illustrating a general overview of the galley refrigeration system for aircraft according to the invention.

The present invention is directed to a control system for an aircraft galley air cooler for refrigerating food carts within the galley. Generally, the system for refrigerating food carts includes a set of remote chillers which remove heat from a distributed liquid refrigerant system, which in turn removes heat from one or more food carts to refrigerate the food carts. The entire system is electronically monitored and controlled by the control system to provide a sufficiently chilled environment within a potentially large number of food carts.

More specifically, the present invention includes an electronic control system for monitoring and controlling three distributed refrigeration subsystems. The first refrigeration subsystem includes at least one remote chiller, the second refrigeration subsystem includes at least one galley air cooling unit, and the third refrigeration subsystem includes at least one recirculation unit.

Each remote chiller constitutes a self-contained refrigeration unit, which serves to remove heat from a liquid refrigerant, referred to as the intermediate working fluid. The intermediate working fluid is then distributed to the second refrigeration subsystem. The galley air cooling units each include a galley cart and a galley plenum. The chilled intermediate working fluid is distributed into and exits from a heat exchanger within the galley plenum. A blower or fan within the plenum blows air over the exchanger and through the galley cart. In this manner, the galley cart may be continually flushed with air chilled by the galley plenum heat exchanger.

Upon exiting the galley plenum the intermediate working fluid is distributed to the third refrigeration subsystem. Each recirculation unit may include one or more liquid pumps and expansion tank or accumulator. The one or more pumps of the recirculation units pressurize the intermediate working fluid for redistribution to the remote chillers. The accumulators of the recirculation units allow for the storage and thermal expansion of the intermediate working fluid.

The control system is also a distributed system which may monitor and control individual components of each refrigeration subsystem. Individual electronic devices may be used to monitor and control the temperature within each galley cart. The galley air cooling units may include a control valve to vary the amount of liquid refrigerant entering the galley plenum. The electronic devices monitoring the temperature of the air in the galley cart may be used to adjust the control valve. These same electronic devices may also be used to turn the fan in the galley plenum on and off.

Other electronic devices may be used to monitor and control the recirculation units. These electronic devices monitor and control the recirculation units. These electronic devices may also be configured to monitor the pressure and volume within the expansion tank. The recirculation units may be controlled by turning the pumps on and off or by varying the speeds by which the pumps operate.

Other electronic devices may also be used to monitor and control the remote chillers. By monitoring the pressure and temperature within the remote chiller the electronic devices can appropriately determine which remote chillers to operate at different times.

The electronic subsystem may be powered by the electrical power systems of the aircraft. The electronic subsystem may also include any number of display systems and interfaces for control by the crew. An overall control system may operate each individual electronic device.

The entire system and each individual component should be configured for operation within the unique environment presented by transport aircraft. Equipment used on commercial aircraft must meet strict requirements. In addition to maintaining food at safe temperatures, general aircraft operating requirements must be met.

As depicted in FIG. 1, several components combine to form a galley air cooling unit 18. A galley cart 20 is typically stored within a galley plenum 22 while storing food. To safely store the food, the air within the galley cart must be stored at or below a specific temperature. For example, 4° C. (39° F.) is the temperature required by certain agencies. The galley plenum is equipped with gaskets to form an air tight seal with the galley cart. The galley plenum may be equipped with a blower or fan which circulates air throughout the galley cart and over at least one heat exchanger 26 within the galley plenum. Ducts 25 between the galley cart and the galley plenum direct the flow of air across the stored food.

The heat exchanger 26 within the galley plenum 22 may include a plate and fin configuration optimized for removing heat from passing air. The heat exchanger 26 provides for the exchange of thermal energy between ambient air and a liquid refrigerant, also referred to as a heat transfer fluid, or the intermediate working fluid 27. A known heat transfer fluid having appropriate thermal and physical properties for use with the present invention is a fluorinated heat transfer fluid sold under the trademark GALDEN® HT 135. GALDEN® HT 135 is a perfluoropolyether or PFPE fluid sold by the Ausimont Montedison Group, although other similar heat transfer fluids may also be suitable.

A large number of the galley carts 20 may be required on a single aircraft. In one embodiment, each galley cart may require a thermal exchange of approximately 750–1000 BTUs per hour. The corresponding air flow requirement of each galley cart in such an arrangement would then be approximately 72 cubic feet per minute. The corresponding fluid flow through each heat exchanger 26 would be approximately 0.64 gallons per minute (using GALDEN® HT 135). Control Systems in accordance with the present invention may be designed to meet these requirements for as many galley carts as are used on an aircraft.

A proportional flow valve 28 may be used to control the flow of the intermediate working fluid 27 from each heat exchanger 26 within the galley plenum 22. It is also contemplated that a single proportional flow valve may control the flow of fluid into two or more heat exchangers. One method of controlling the temperature of the air within the galley cart 20 is to electronically manipulate the proportional flow valve via the control system so as to regulate the flow of fluid into the heat exchanger.

As depicted in FIG. 1, the source of the chilled intermediate working fluid is at least one remote chiller unit 30. After exiting the heat exchanger 26 within the galley plenum 22 the intermediate working fluid is no longer chilled. The unchilled intermediate working fluid is returned to the chiller unit via the valve 28, cooled, and redistributed throughout the system by at least one recirculation unit 32.

Figure 2:
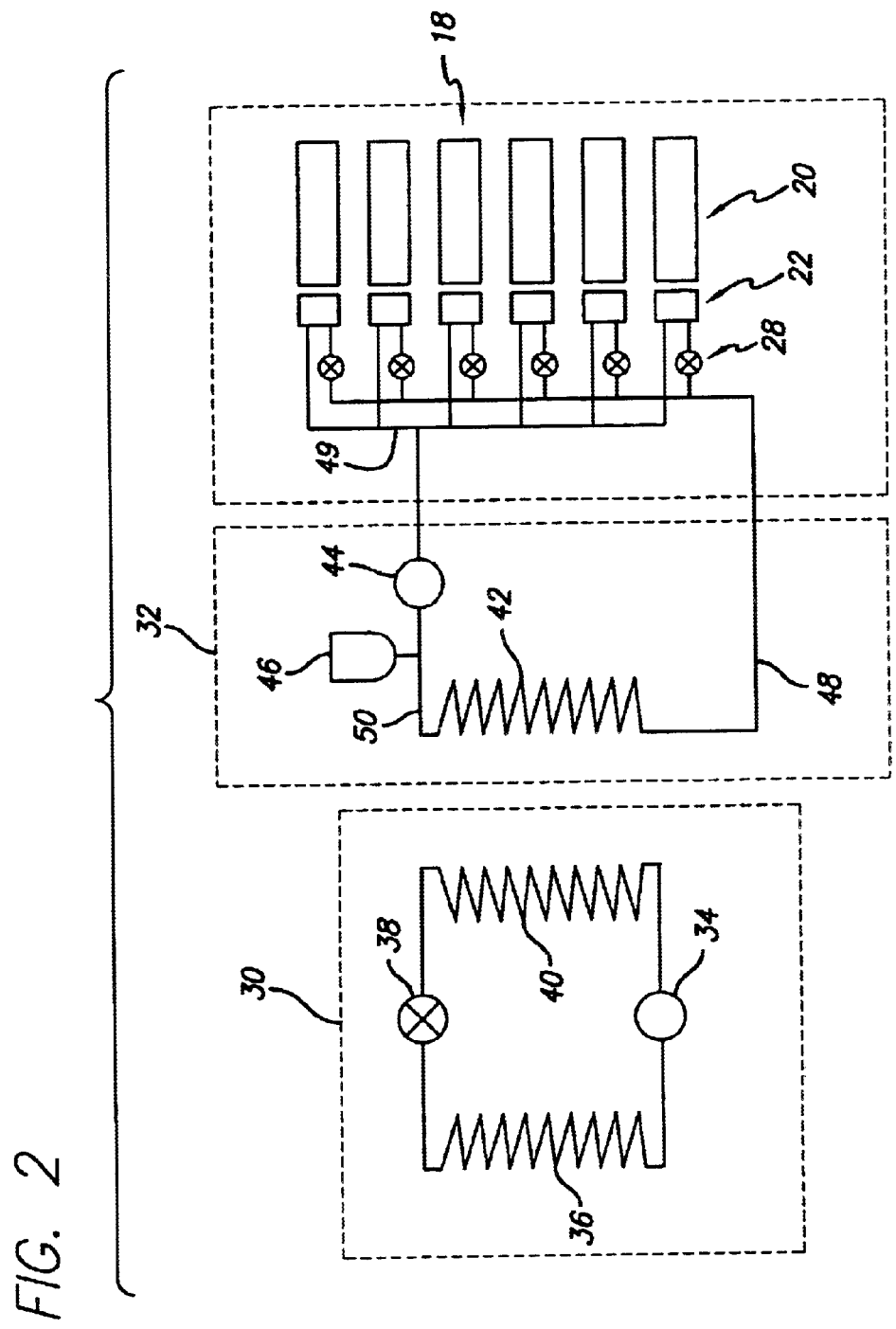
FIG. 2 is a schematic diagram illustrating the general design parameters of the galley refrigeration system for aircraft according to the invention.

As depicted schematically in FIG. 2, a simple galley air cooler system may include a remote chiller unit 30 and a redistribution unit 32 refrigerating several galley carts 20. As an example, the liquid chiller unit may be configured as a vapor cycle refrigeration unit. In such a unit, a compressor 34 (a pump or other machine that increases the pressure of a gas) may be powered by the aircraft's electrical system. A rotary-type compressor may be used to compress low temperature and pressure vapor into high temperature and pressure super-heated vapor. The material to form this vapor is also a refrigerant and may be referred to as a chiller working fluid 35 (See FIG. 1). A known material which has appropriate thermal and physical properties for use in the galley air cooler as the chiller working fluid is a hydrofluorocarbon refrigerant such as that sold under the name HFC-134a available from DuPont, or sold under the name MEFOREX 134a, or HT 134a, available from Ausimont, as a replacement for CFC12, although other similar refrigerants may also be suitable.

From the compressor 34, the chiller working fluid 35 flows into a condenser 36. The condenser may be configured as a tube-fin heat exchanger to maximize heat rejection. From the condenser, the chiller working fluid flows through an expansion valve 38 into an evaporator 40. The evaporator may be configured as a plate-fin heat exchanger to maximize heat absorption.

Associated with the evaporator 40 is an expelling heat exchanger 42. The intermediate working fluid 27 flows through the expelling heat exchanger. The association of the evaporator with the expelling heat exchanger forms a chiller unit heat exchanger 43 (see FIG. 1) and enables a thermal exchange between the intermediate working fluid and the chiller working fluid 35 without the fluids ever mixing. As the chiller working fluid passes through the evaporator 40, back into the compressor 34, it draws heat from the expelling heat exchanger and the intermediate working fluid.

A remote chiller unit 30 may be required to maintain a required low temperature in several galley carts 20. As an example, the total heat rejection required of a single remote chiller unit may be about 18,000 BTUs per hour. This would require a flow rate of the intermediate working fluid 27 of about 4.6 gallons per minute (using GALDEN® HT135). A corresponding flow rate through the condenser would be about 700 cubic feet per minute at about 3.5 inches $H_2O$ pressure (using HT-134a). This could be supplied by a condenser blower wheel operating at about 5,750 revolutions per minute. Further requirements of such a remote chiller unit 30 may be an air venting fan as well as a mechanical bypass valve.

The unchilled intermediate working fluid 27 flows out of the heat exchanger 26 in the galley plenum 22 and is redistributed to a liquid pump 44 in at least one recirculation unit 32. The liquid pumps may supply all the force required to maintain the circulation of the intermediate working fluid through the components of the system.

Within the recirculation unit 32, the intermediate working fluid 27 flows into an expansion tank 46. The expansion tank functions as an accumulator and a reservoir for the intermediate working fluid. The expansion tank allows for thermal expansion of the intermediate working fluid. Throughout the entire process, the intermediate working fluid may remain in the liquid state.

Each recirculation unit 32 may gather intermediate working fluid 27 from several galley air cooling units 18. Each recirculation unit may also provide intermediate working fluid to several remote chiller units 30. As an example, the flow rate through a single recirculation unit may be about 10 gallons per minute. The recirculation units may also be required to provide a pressure differential of about 100 pounds per square inch in the intermediate working fluid.

Figure 3:
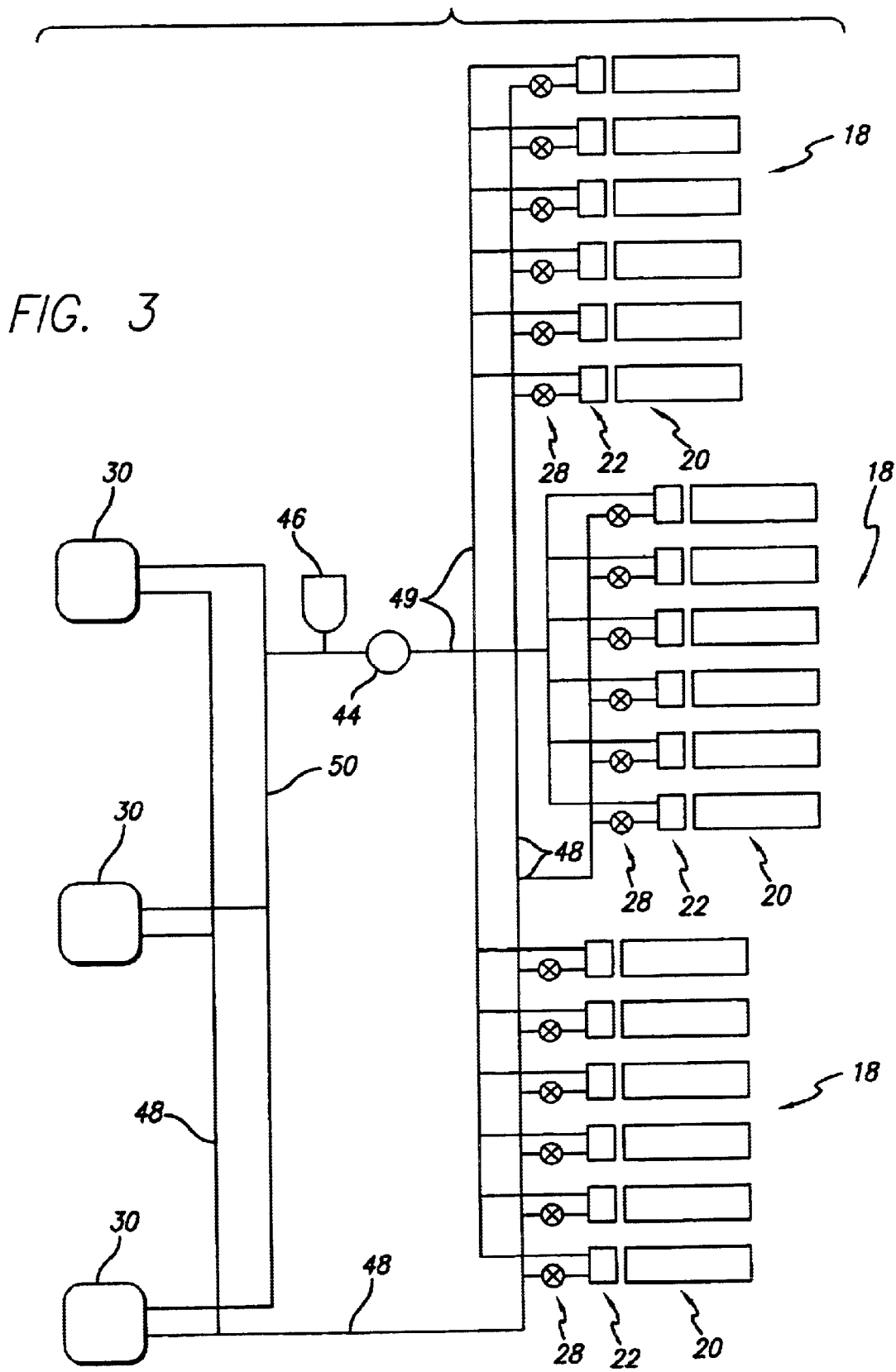
FIG. 3 is a schematic diagram of a distributed version of the galley refrigeration system for aircraft according to the invention.
Figure 4:
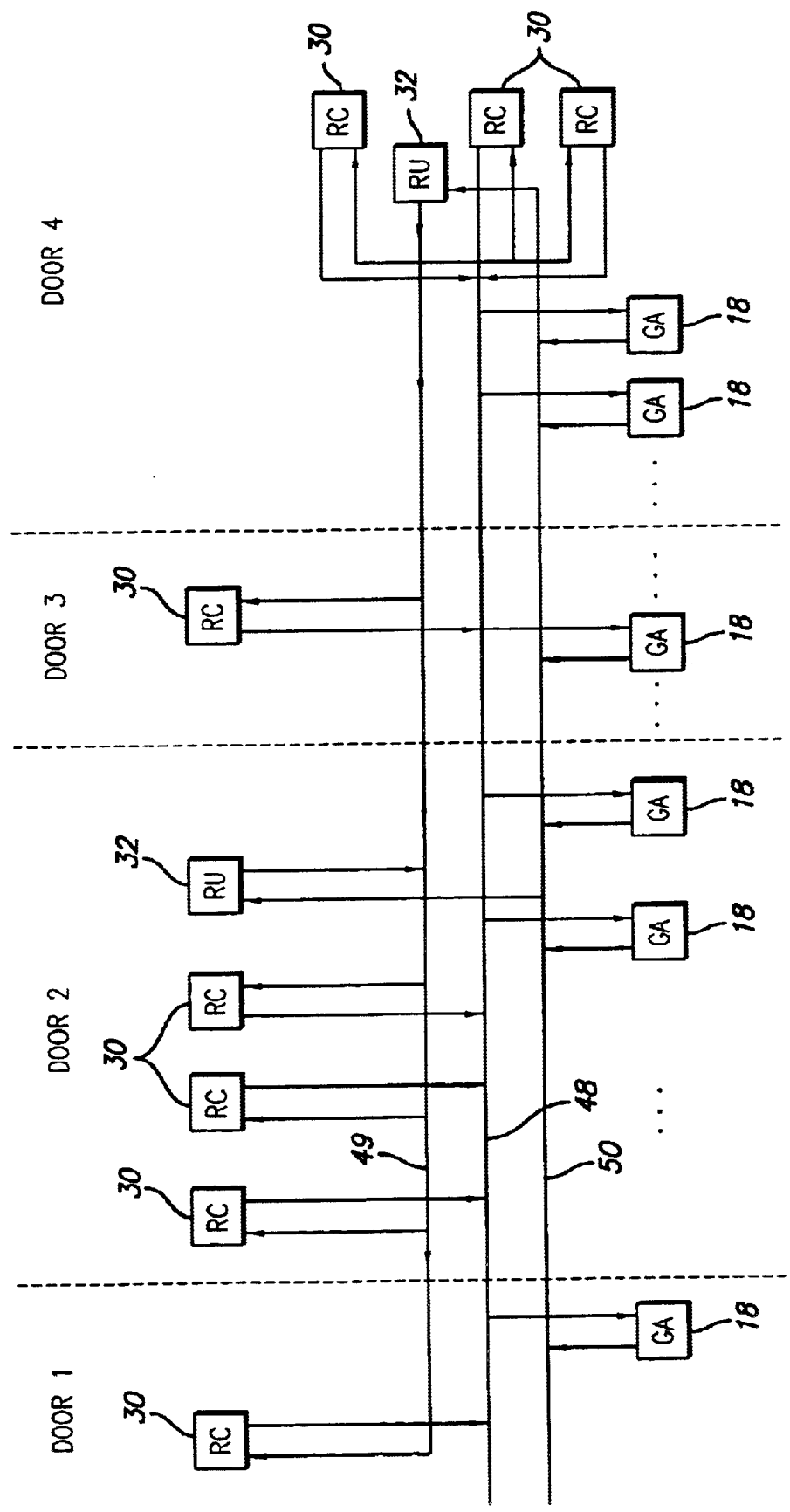
FIG. 4 is a schematic diagram of a first version of a layout of a distributed galley refrigeration system for aircraft according to the invention.
Figure 5:
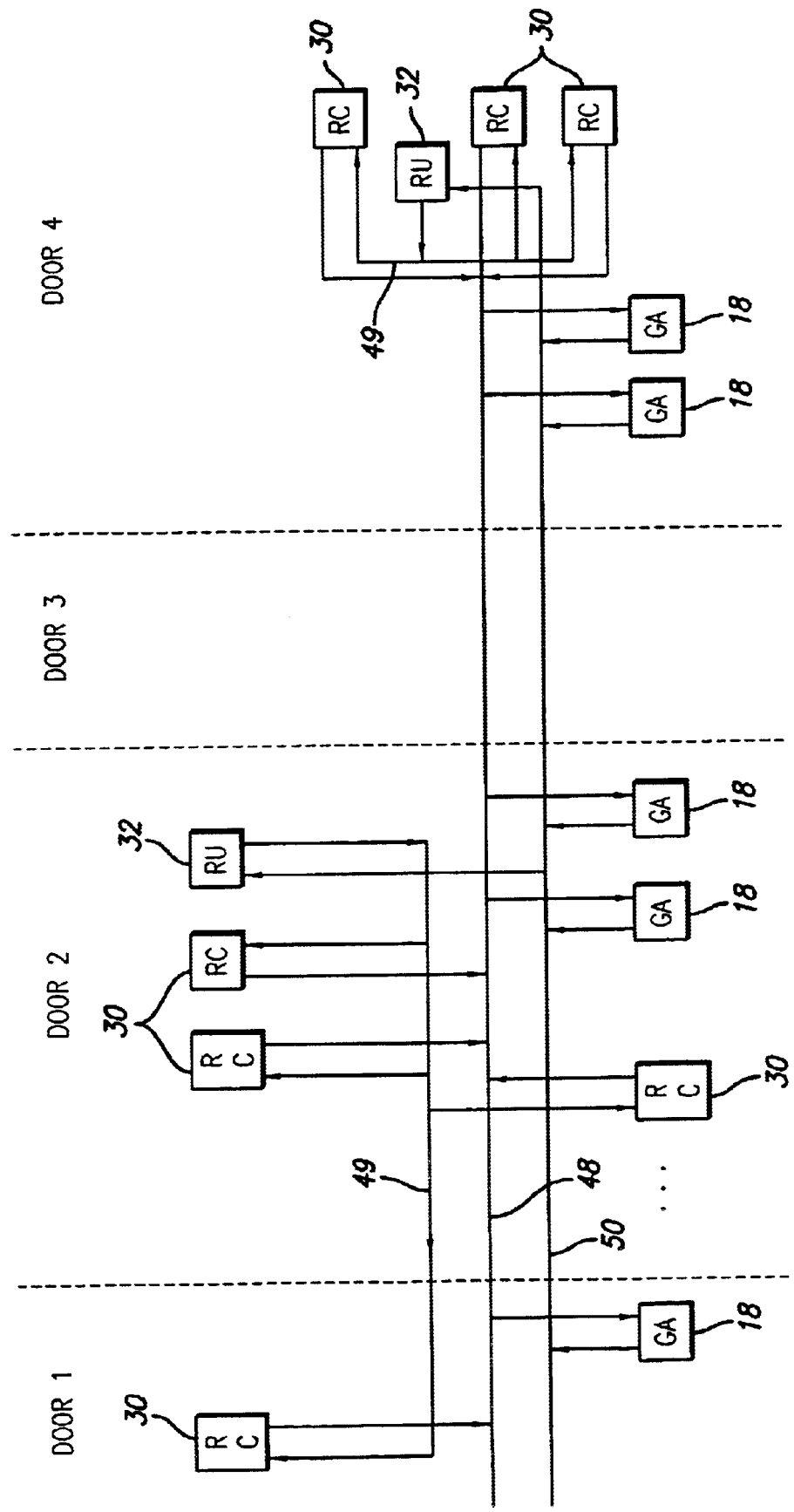
FIG. 5 is a schematic diagram of a second version of a layout of a distributed galley refrigeration system for aircraft according to the invention.
Figure 6:
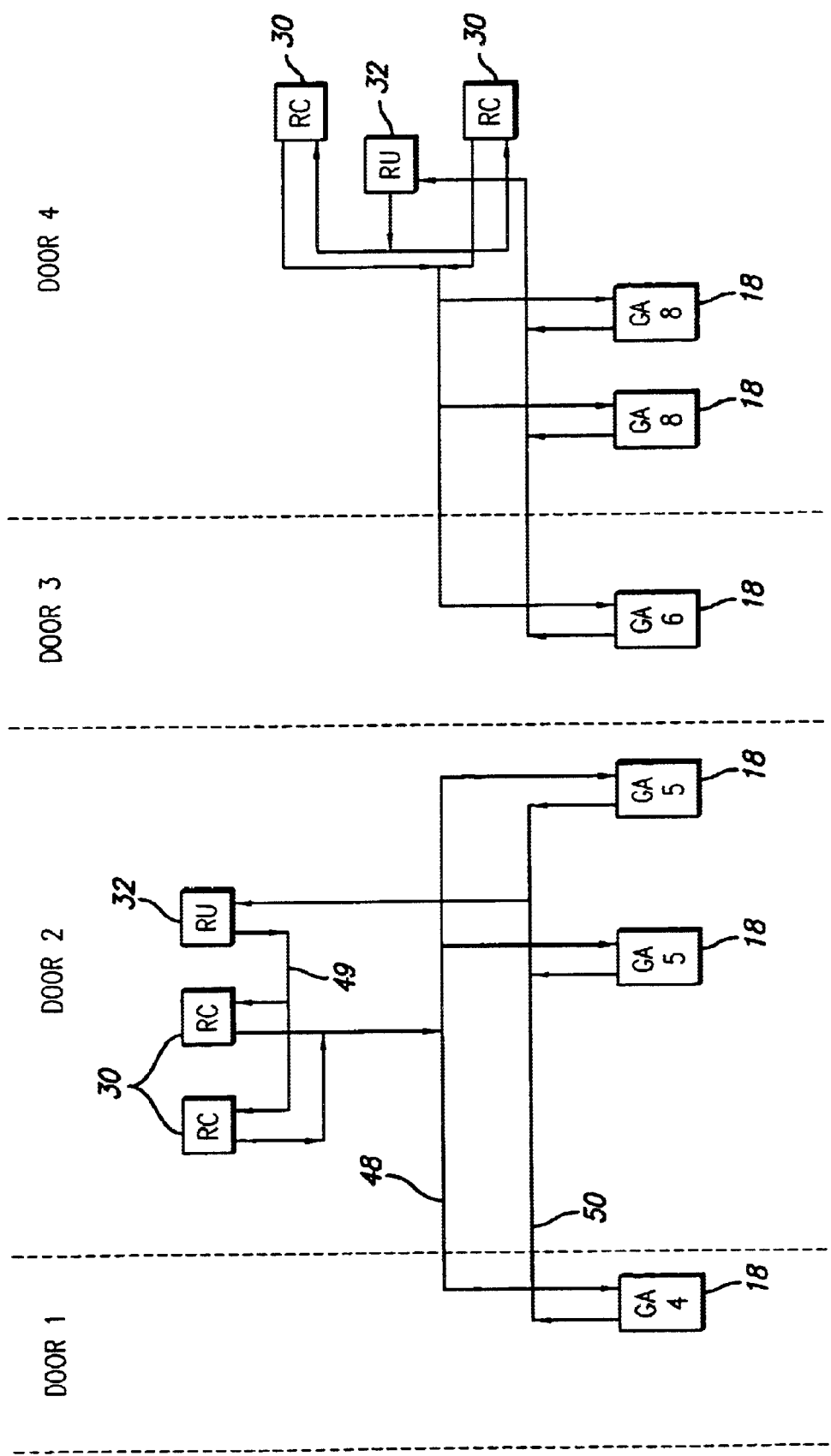
FIG. 6 is a schematic diagram of a third version of a layout of a distributed galley refrigeration system for aircraft according to the invention.
Figure 7:
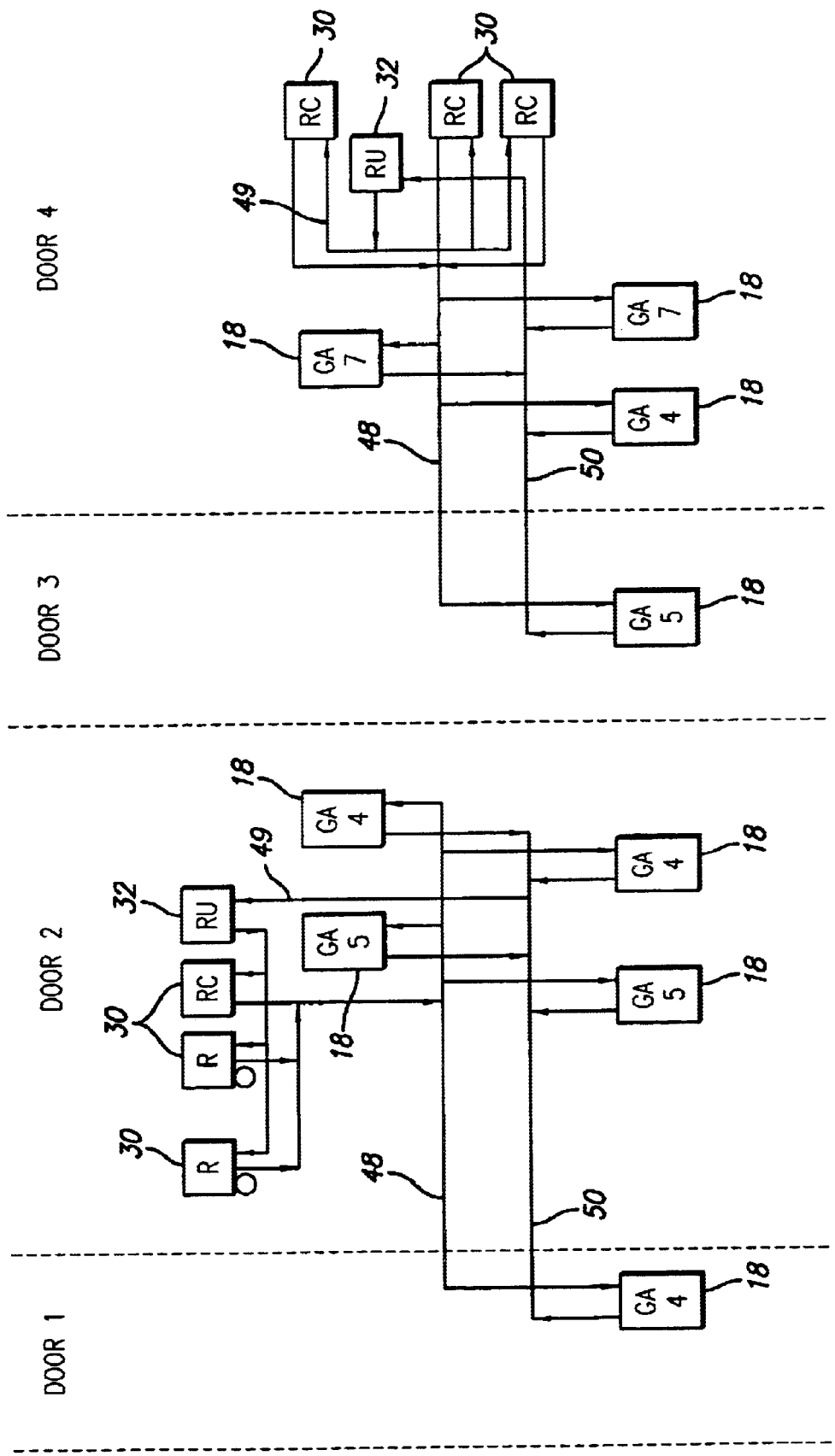
FIG. 7 is a schematic diagram of a fourth version of a layout of a distributed galley refrigeration system for aircraft according to the invention.

To circulate the intermediate working fluid 27 throughout the distributed system, a network of ducts connects the individual components (see FIGS. 2 and 3). Supply ducts 48 are configured to distribute the chilled intermediate working fluid to the galley air cooling units 18. Redistribution ducts 49 are configured to route the unchilled intermediate working fluid to the liquid pumps 44. Return ducts 50 are configured to distribute the unchilled intermediate working fluid to the remote chiller units 30.

Figure 8A:
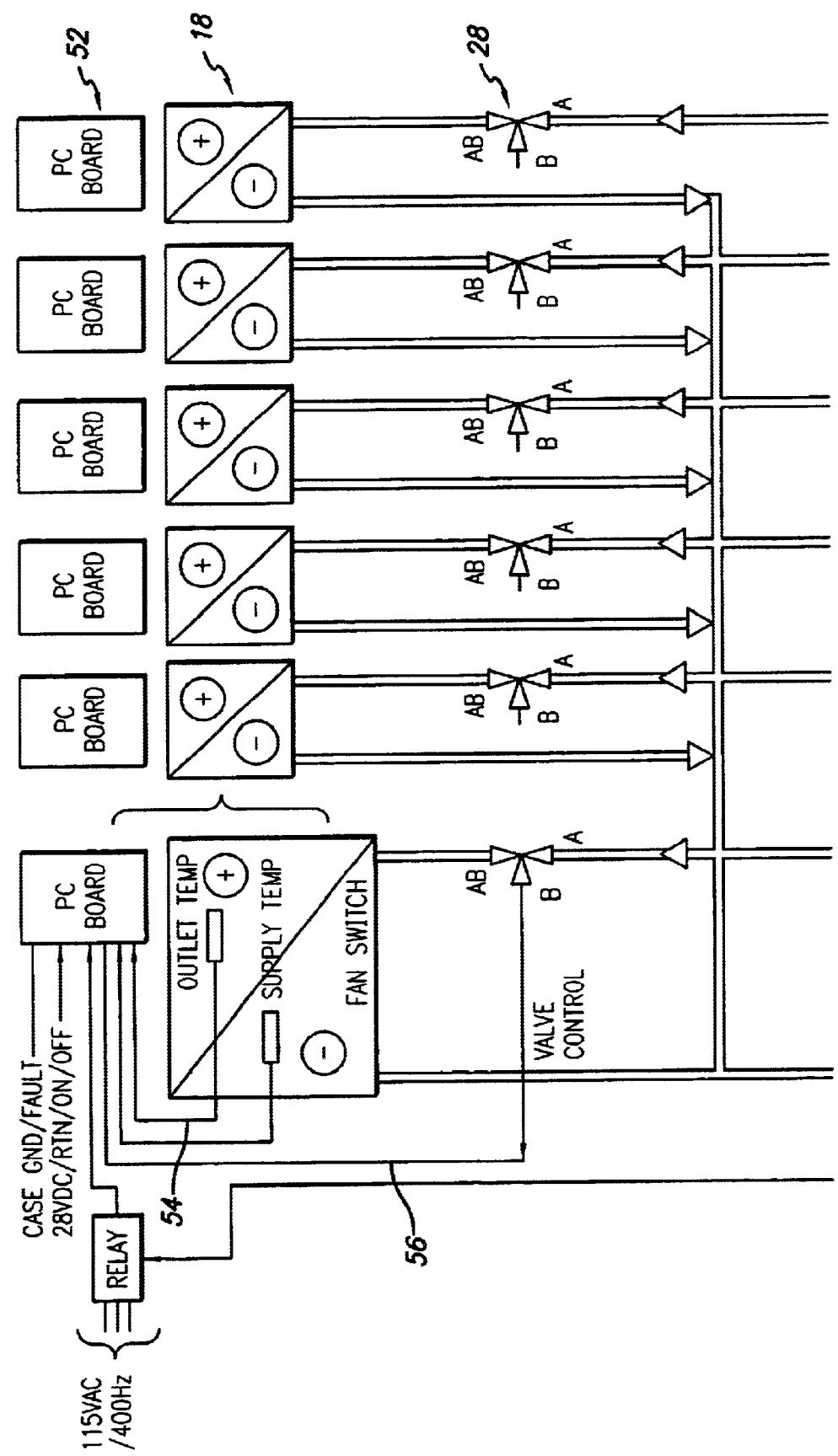
FIG. 8 is a schematic diagram of an electronic control system for controlling the galley refrigeration system for aircraft according to the invention.
Figure 8B:
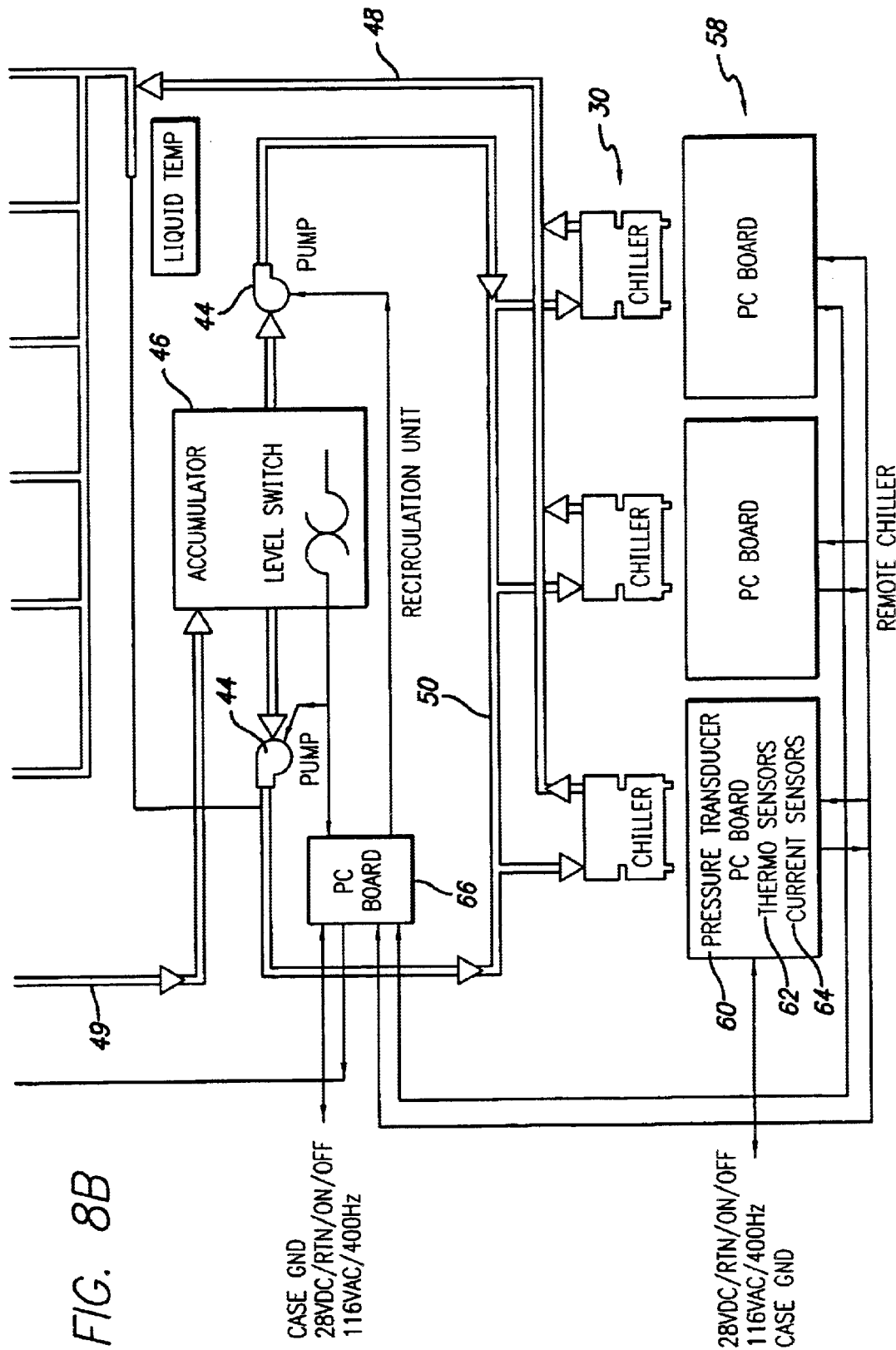

As depicted in FIG. 8, the present invention includes a comprehensive electronic system to monitor and control the distributed refrigeration system. A galley cart control device 52 may be associated with each galley air cooling unit 18. An air outlet temperature sensor 54 and an air supply temperature sensor 56 may each provide input to the galley cart control device. The galley cart control device may then power the blower 24 on or off as well as control the output of the proportional flow valve 28.

A chiller unit monitoring device 58 may be associated with each remote chiller unit 30. By means of a pressure transducer 60, a thermo-sensor 62 and a current sensor 64, the chiller unit monitoring device may measure the function of the remote chiller unit. If needed, the chiller unit monitoring device could shut down the remote chiller unit.

A system monitoring and control device 66 may be associated with each recirculation unit 32, or may be associated with the system as a whole. The system monitoring and control device may monitor the volume and pressure within each expansion tank 46 as well as the functioning of the liquid pumps 44. Furthermore, the system monitoring device may monitor the temperature and pressure of the intermediate working fluid 27 at various locations within the system. The system monitoring and control device may also receive input from the chiller unit monitoring devices 58 and the galley cart control devices 52. With this information, the system monitoring and control device may control the functioning of each and every electronic and refrigeration component of the entire system.

Figure 9:
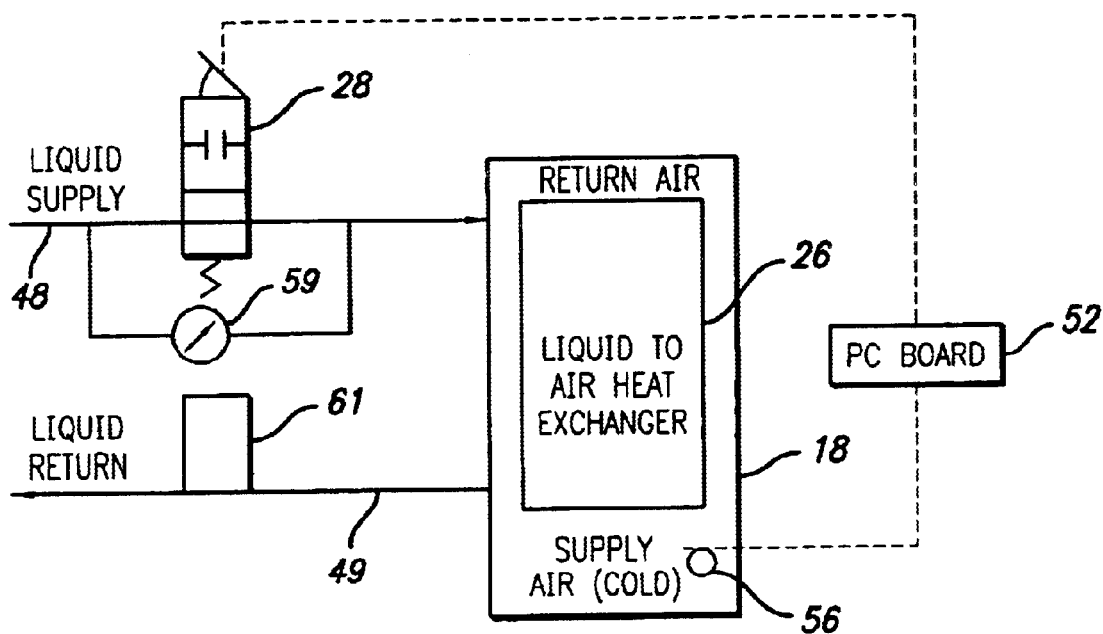
FIG. 9 is a schematic diagram of a galley air cooling unit of the galley refrigeration system for aircraft according to the invention.

As depicted in FIG. 9, the galley cart control device 52 may control the temperature of the air in the galley cart 20 by regulating the flow of the intermediate working fluid 27 into the heat exchanger 26 within the galley plenum 22. The air supply temperature sensor 56 measures the temperature of the cold supply air and relays that information to the galley cart control device. In order to ensure that the cold supply air remains near a specified temperature (e.g. about −1° C. (30° F.)) the galley cart control device can increase or decrease the flow of intermediate working fluid by controlling the proportional control valve 28. As the flow of the intermediate working fluid into the heat exchanger increases the temperature of the supply air will decrease and vice versa. The galley control device may also monitor the temperature of the intermediate working fluid at various locations or the temperature of the air returning to the heat exchanger. Furthermore, a differential pressure gauge 59 on the supply ducts 48 and a flow meter 61 on the redistribution ducts 49 may provide additional information about the flow of intermediate working fluid into and out of the galley air cooling unit 18. The galley cart control device could use this further information to more efficiently regulate the proportional flow valve or to turn the blower on and off.

Figure 10:
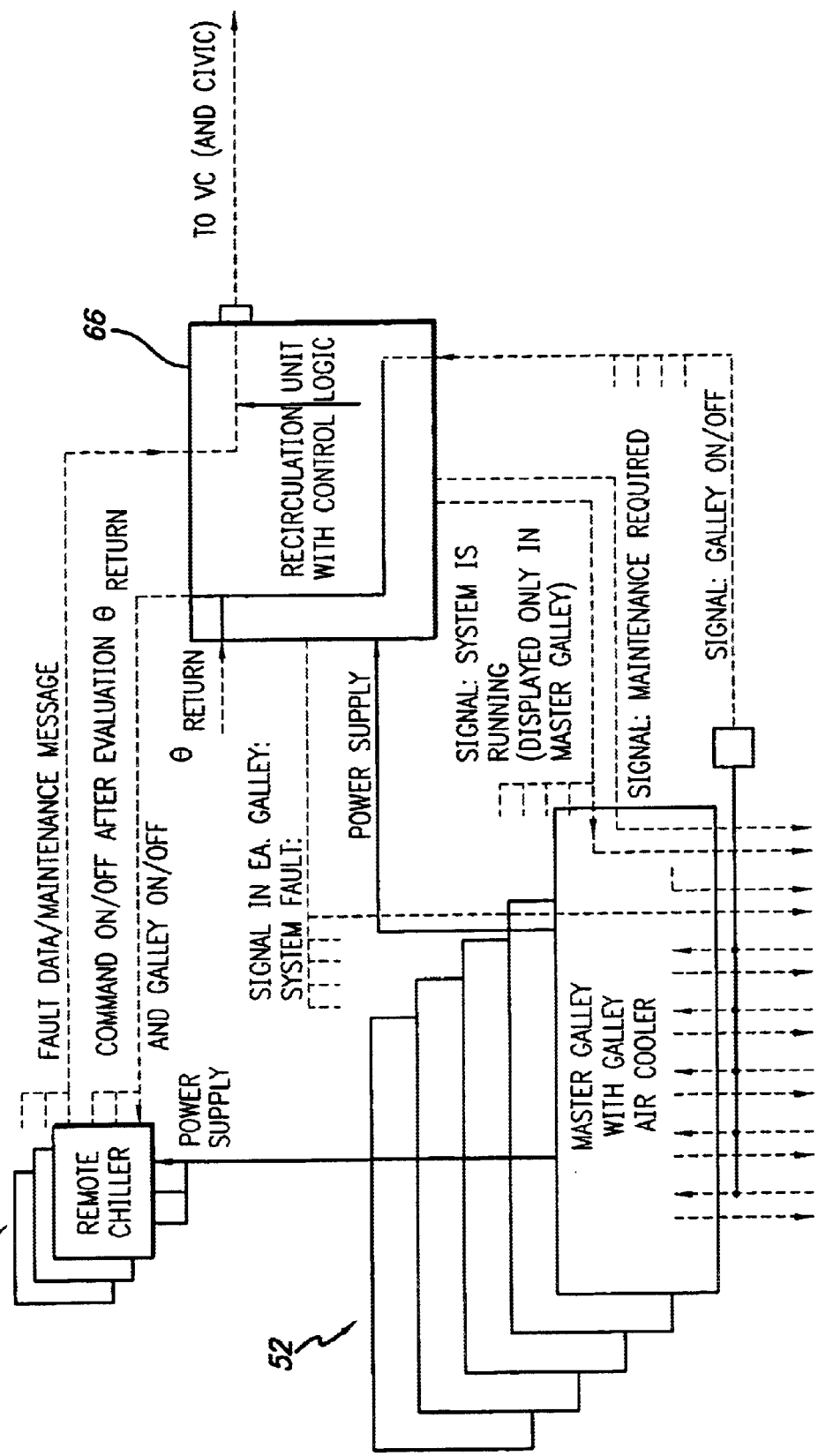
FIG. 10 is a signal block diagram of an electronic control system for controlling the galley refrigeration system for aircraft according to the invention.

As depicted in FIG. 10 the components of the electronic subsystem may be interrelated via the system monitoring and control device 66 also referred to as the recirculation unit with control logic. That is, the same electronic device used to monitor and control the recirculation unit 32 may be programmed to control the overall functioning of the entire system. This may include such functions as malfunction detection and providing maintenance information. Each galley cart control device 52 and chiller unit monitoring device 58 may be configured to send signals to the system monitoring and control device relaying information about the status of the galley air cooling units 18 and remote chiller units 30. In turn, the system monitoring and control device could send signals back to the galley cart control device and chiller unit monitoring device instructing the devices on how to control each galley air cooling unit and remote chiller unit.

Figure 11:
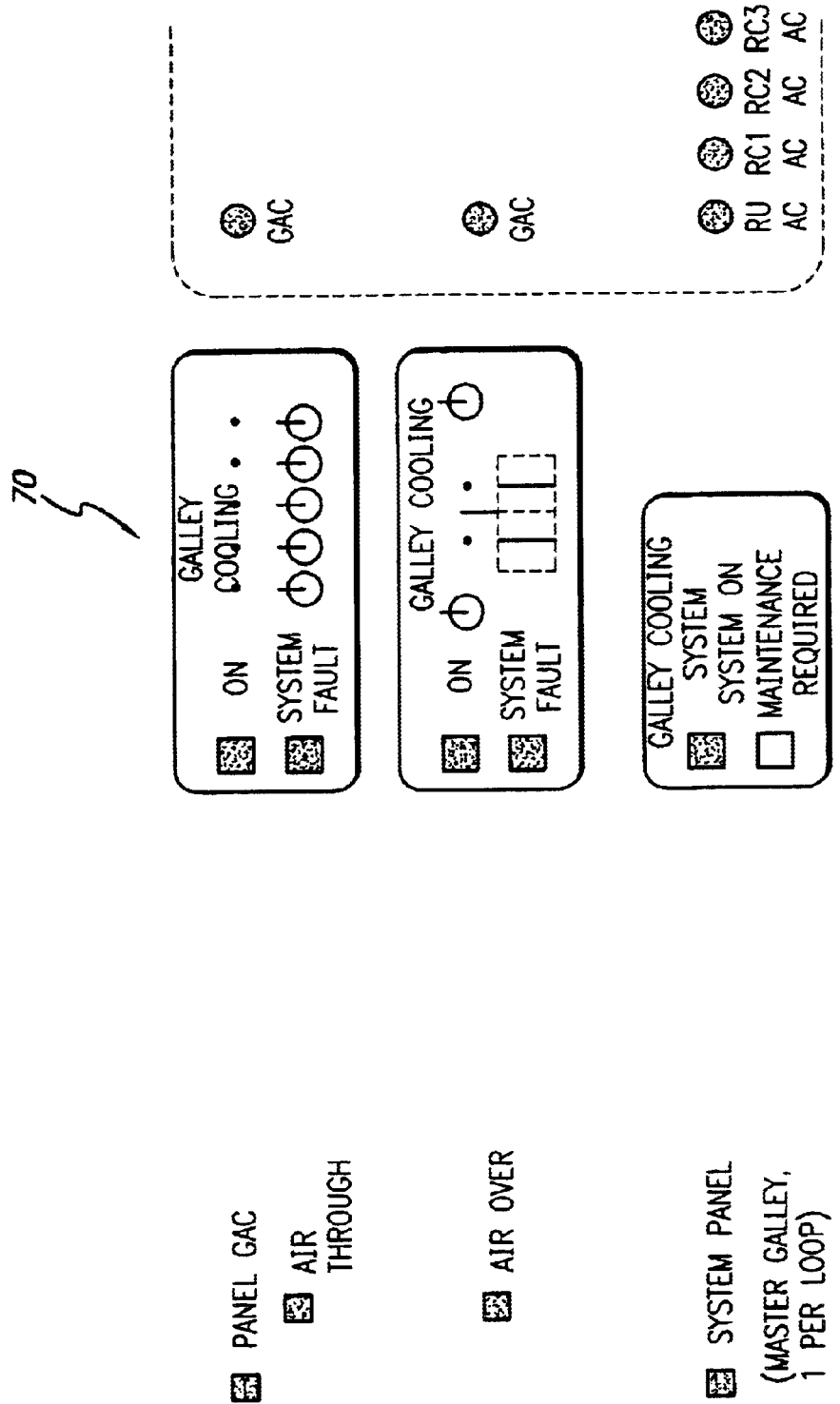
FIG. 11 is a diagram of a control panel for operation of the control system for controlling the galley refrigeration system for aircraft according to the invention.

As depicted in FIG. 11, at least one display 70 may be included with the electronic subsystem. The display enables crew interface with the refrigeration system. A set of lights indicates the status of the various components. A set of switches may permit crew control of the various components. The display may be electronically controlled by the system monitoring and control device 66.

Figure 12:
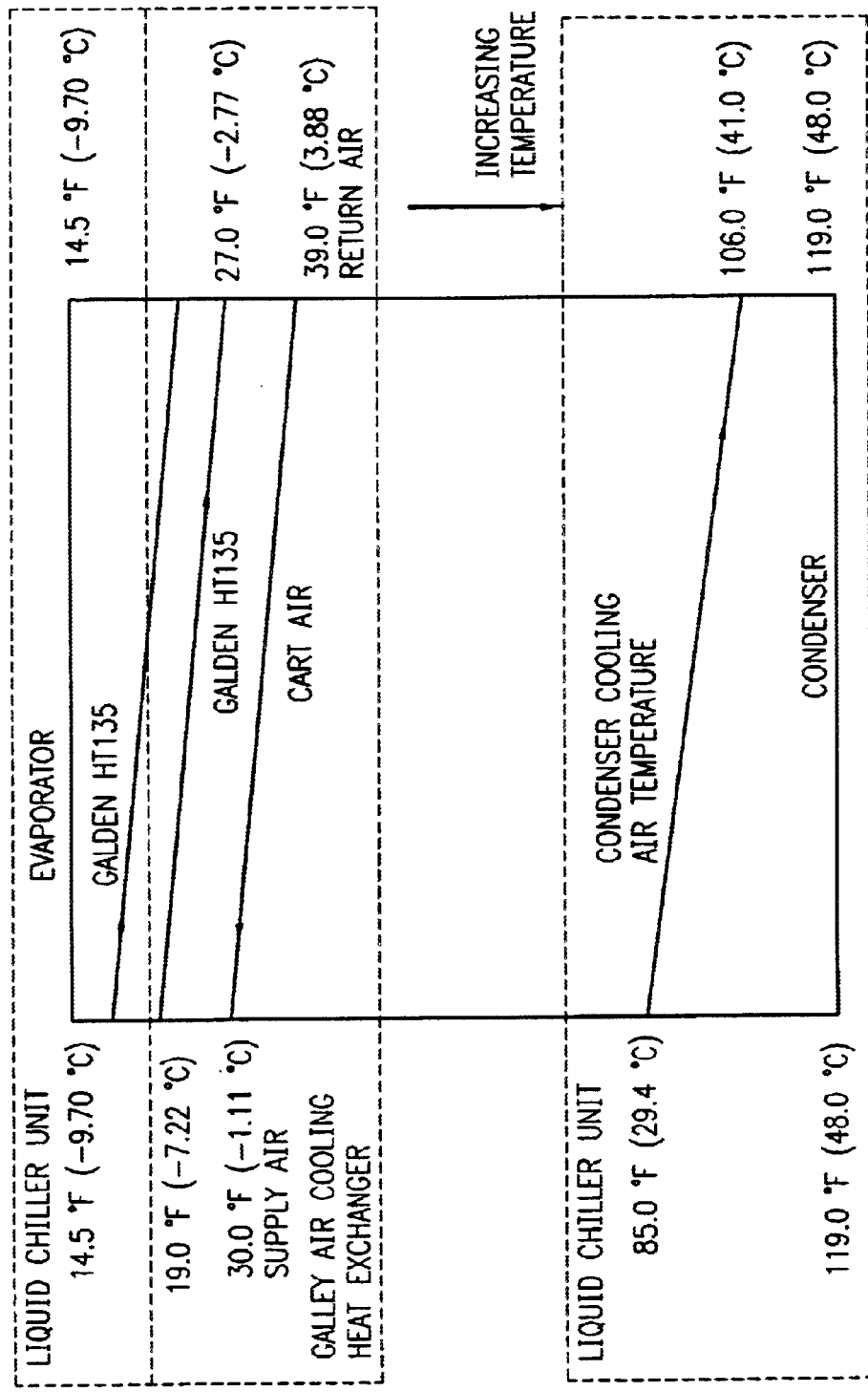
FIG. 12 is an overall thermodynamic chart of the galley refrigeration system for aircraft according to the invention.

FIG. 12 depicts a thermodynamic chart showing the functioning of the refrigeration subsystems. The information provided by the chart is exemplary of a system in accordance with the present invention. The chart depicts the refrigeration process as a series of heat exchanges between the various fluids involved in the process.

In another aspect of the invention, with reference to FIG. 1, the recirculation unit 32 annunciates a system leak condition based on the indications of a working fluid or liquid level middle sensor 100, a working fluid or liquid temperature sensor 102, and the flight phase. The flight phase is interpreted from a message 104 sent to the recirculation unit 32 by a ventilation controller 106. The system leak condition is only evaluated and annunciated during a ground flight phase, value 10 in the table below, and the cruise flight phase, value 6 in the table below, defining the valid flight phase values.

TABLE 1

| System Flight Phase | |
|---|---|
| Value | Description |
| 1 | Power Up - Engine Start |
| 2 | Engine Start - Engine Take-Off Power |
| 3 | Engine Take-Off Power - 80 kts |
| 4 | 80 kts - Lift Off |
| 5 | Lift Off - 1500 feet |
| 6 | Cruise |

TABLE 1-continued

System Flight Phase

| Value | Description |
|---|---|
| 7 | 800 feet - Touch Down |
| 8 | Touch Down - 80 kts |
| 9 | 80 kts - Last Engine Stopped |
| 10 | Last Engine Stopped + 5 minutes |

Annunciation of a system leak requires a confirmation time of the middle liquid level sensor 100 to indicate the absence of liquid continuously for 15 minutes, which means that if during this confirmation time the middle liquid level sensor indicates the presence of liquid, then the 15 minute confirmation timer for this condition will be restarted. Additionally, confirmation of a system leak takes into consideration the temperature indicated by the Galden liquid temperature sensor 102 following the 15 minute confirmation time of the middle liquid level sensor 100. If the temperature indicated by the Galden liquid temperature sensor 102 is greater than or equal to 13 degrees F., and less than or equal to 55 degrees F., then a minor system leak condition is confirmed. If the temperature indicated by the Galden liquid temperature sensor 102 is greater than 55 degrees F., then a major system leak condition is confirmed. A fault message 108 indicating either a minor or major system leak condition is sent to the ventilation controller. However, if the flight phase changes during the confirmation of these leak conditions, the conditions are considered cancelled.

The recirculation unit 32 annunciates a "no Galden liquid" failure condition based on the indications of a bottom liquid level sensor 110, an accumulator pressure sensor 112, and a discharge pressure sensor 114. Together, the accumulator pressure and the discharge pressure are used to determine a differential pressure, by subtracting the discharge pressure from the accumulator pressure. The differential pressure is measured at all times when a pump is running. When the differential pressure drops below 50 psi for 7 seconds continuously, this constitutes a pump airlock condition for a given pump. If this condition is persistent for 3 consecutive times following a short rest period, control is transferred to an unused pump. If the same 3 consecutive pump airlock conditions are detected on the new pump, this constitutes on "pump airlock failure." Therefore, under this definition, one pump airlock failure involves 6 individual airlock conditions. When 10 such pump airlock failures occur per any given power-on time, the recirculation unit 32 determines this to be a complete pump airlock failure condition based on the low Galden liquid level. If the recirculation unit 32 detects a complete pump airlock failure, the recirculation unit 32 annunciates this failure to the ventilation controller via a fault message 108.

It will be apparent to those of skill in the art that the exemplary systems described in this detailed description conform to the invention described. It will also be apparent to those of skill in the art that various modifications may be made to the exemplary systems while remaining within the scope of the invention. Thus, the invention is not intended to be limited to the examples described herein. The scope of the invention is described and limited only by the following claims.

What is claimed is:

1. A liquid sensing system for a cooler for an aircraft using a two phase working fluid, the aircraft cooler circulating the two phase working fluid between a cooling heat exchanger and a chiller unit for cooling the two phase working fluid, the liquid sensing system comprising:
   a middle liquid level sensor for detecting a middle liquid level of the working fluid and generating a middle liquid level signal;
   a liquid temperature sensor for sensing temperature of the working fluid and generating a liquid temperature signal;
   means for generating a flight phase signal indicative of a flight phase of the aircraft; and
   a recirculation unit for receiving said middle liquid level signal, said liquid temperature signal, and said flight phase signal, said recirculation unit annunciating a working fluid system leak condition based on said middle liquid level signal, said liquid temperature signal, and said flight phase signal.

2. The liquid sensing system of claim 1, wherein said recirculation unit only evaluates said working fluid system leak condition during a ground flight phase and a cruise flight phase.

3. The liquid sensing system of claim 1, wherein said recirculation unit requires a confirmation time of said middle liquid level sensor to indicate the absence of working fluid continuously for 15 minutes to annunciate a working fluid system leak condition.

4. The liquid sensing system of claim 3, wherein said recirculation unit additionally annunciates a system leak based upon a temperature indicated by said liquid temperature sensor following the 15 minute confirmation time of said middle liquid level sensor.

5. A method for sensing leaks in a cooler for an aircraft using a two phase working fluid, the aircraft cooler circulating the two phase working fluid between a cooling heat exchanger and a chiller unit for cooling the two phase working fluid, the method comprising:
   detecting a middle liquid level of the working fluid and generating a middle liquid level signal;
   sensing temperature of the working fluid and generating a liquid temperature signal;
   generating a flight phase signal indicative of a flight phase of the aircraft; and
   receiving said middle liquid level signal, said liquid temperature signal, and said flight phase signal, evaluating a working fluid system leak condition, and annunciating said working fluid system leak condition based on said middle liquid level signal, said liquid temperature signal, and said flight phase signal.

6. The method of claim 5, wherein said working fluid system leak condition is only evaluated during a ground flight phase and a cruise flight phase.

7. The method of claim 5, wherein annunciation of said working fluid system leak condition requires a confirmation time of said middle liquid level signal to indicate the absence of said working fluid continuously for 15 minutes.

8. The method of claim 7, wherein annunciation of said working fluid system leak condition is based upon said liquid temperature signal following the 15 minute confirmation time of said middle liquid level signal.

9. The method of claim 8, wherein if the temperature indicated by the liquid temperature signal is greater than or equal to 13 degrees F., and less than or equal to 55 degrees F., then a minor system leak condition is annunciated.

10. The method of claim 8, wherein if the temperature indicated by the liquid temperature signal is greater than 55 degrees F., then a major system leak condition is annunciated.

11. The method of claim 8, wherein if the flight phase changes during the evaluation of a leak condition, the leak conditions are cancelled.

12. The method of claim 5, further comprising sensing a bottom liquid level and generating a bottom liquid level signal, sensing pressure in a working fluid accumulator and generating an accumulator pressure signal, and sensing a discharge pressure of said working fluid and generating a discharge pressure signal, and annunciating a no working fluid failure condition based on said bottom liquid level signal, said accumulator pressure signal, and said discharge pressure signal.

13. The method of claim 12, further comprising determining a differential pressure based upon said discharge pressure signal and said accumulator pressure signal.

14. The method of claim 13, further comprising determining a pump airlock condition when said differential pressure drops below a predetermined pressure for a predetermined period of time.

15. The method of claim 14, further comprising determining a pump airlock failure condition for a predetermined number of pump airlock conditions.

* * * * *

UNITED STATES PATENT AND TRADEMARK OFFICE
CERTIFICATE OF CORRECTION

PATENT NO.   : 6,832,504 B1
DATED        : December 21, 2004
INVENTOR(S)  : Timothy Birkmann It is certified that error appears in the above-identified patent and that said Letters Patent is hereby corrected as shown below:

Column 5,
Line 38, delete "blower" and insert -- blower 24 --.

Signed and Sealed this

Twenty-fourth Day of May, 2005

JON W. DUDAS
*Director of the United States Patent and Trademark Office*